Aug. 17, 1926.
A. OLSON
TIRE CHAIN
Filed Feb. 13, 1925
1,596,299
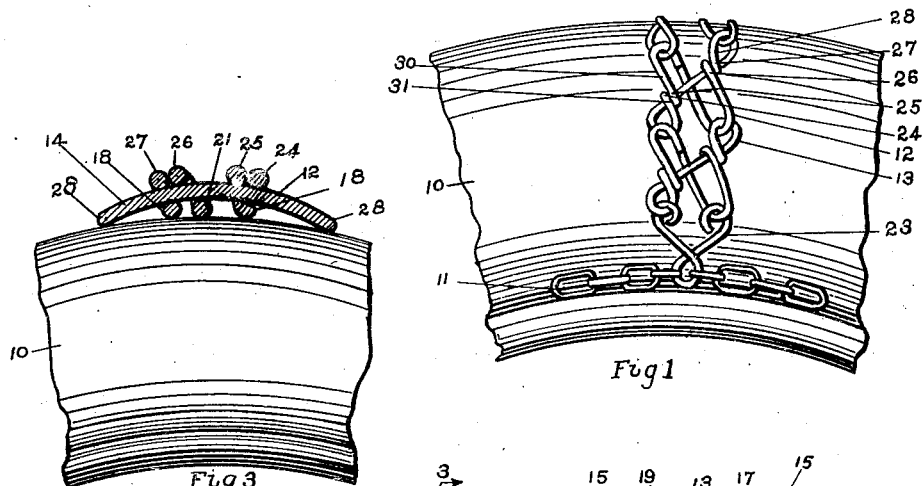
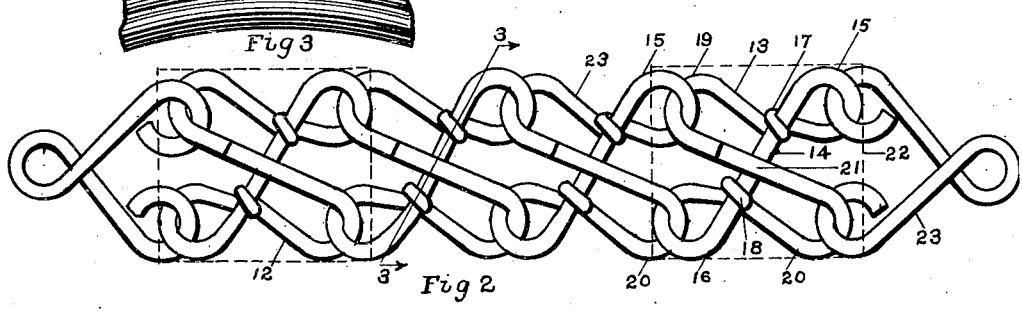
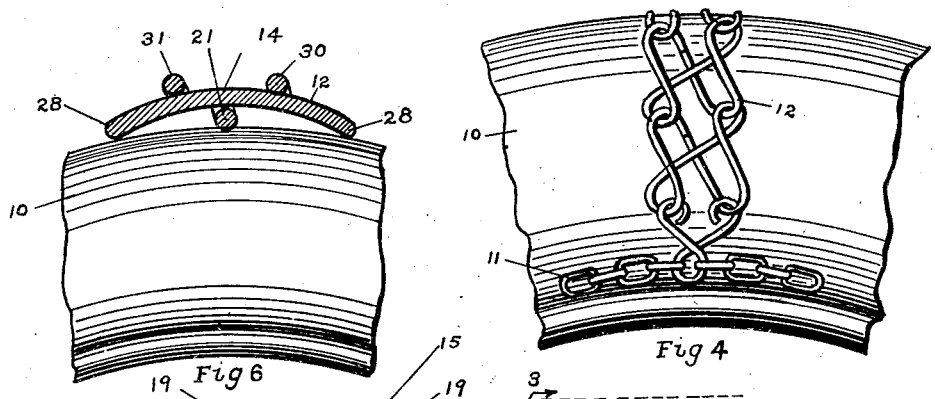
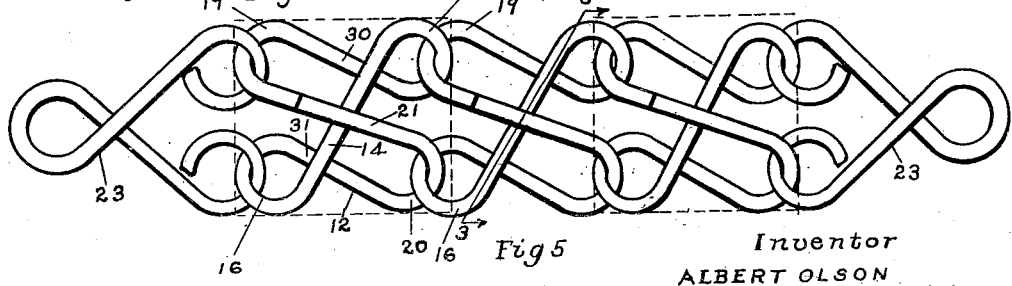
Inventor
ALBERT OLSON
By Clarence S. Walker
His Attorney Patented Aug. 17, 1926.

1,596,299

UNITED STATES PATENT OFFICE.

ALBERT OLSON, OF JAMESTOWN, NEW YORK.

TIRE CHAIN.

Application filed February 13, 1925. Serial No. 9,000.

This invention relates to an improvement in tire chains, and more particularly to an improvement in the construction of the cross chains which extend transversely of the tire.

The primary object of this invention is to provide a cross chain construction of substantially double the width of the usual cross chain, and in which a plurality of surface and tire engaging portions are provided which will hold the vehicle against skidding on an icy road and which will furish traction under all conditions.

A further object of this invention is to provide a cross chain, the links of which are so formed that parallel oblique portions engage the surface and other oblique portions parallel to each other and to the first set of portions engage the tire.

Other objects of this invention will appear from a consideration of the following description, taken in connection with the drawings which form a part thereof, and in which Fig. 1 is a side elevation of a portion of a tire provided with a chain made in accordance with this invention;

Fig. 2 is a bottom plan view of the cross chain, which forms this invention, extended in a plane;

Fig. 3 is a transverse section along the line 3—3 of Fig. 2; and

Figs. 4, 5 and 6 are views similar to Figs. 1, 2 and 3 showing another form of this invention.

Referring to the drawings the reference numeral 10 is employed to designate a tire on which a tire chain made in accordance with this invention is to be mounted. This chain may be of the well known Weed type comprising a pair of side chains 11 at each side of the tire connected by a plurality of cross chains 12 which pass transversely across the tire. While only one such cross chain is showed in the drawing it will be understood that a plurality of such chains is to be provided in accordance with the usual custom. Each cross chain 12 comprises a plurality of identically formed cross links 13, each composed of a single length of wire, bent as will be described hereinbelow.

The free ends of the center length 14 are bent to form loops 15 and 16 and turned once around the length 14 at 17 and 18 and then back upon themselves to form the loops 19 and 20. The free ends of the wire are then brought together, preferably adjacent the length 14, and may there be welded to form a single length 21. The lengths 14 and 21 and the loops 15, 16, 19 and 20 are preferably of such dimension that the link 13 has substantially the contour of a rectangle, as indicated by the dotted lines 22 in Figs. 2 and 4.

Referring to the drawings, and particularly to Fig. 2 it will be noted that each cross link 13 is connected to the adjoining links at each corner by interlacing the loops 15 and 19 and loops 16 and 20. Thus the links are held against rotating or pivoting and rest substantially smoothly against the tire and the surface. The cross chains 12 are formed by interlacing a number of links 13, as pointed out, and welding or otherwise joining the adjoining ends of each wire to form the lengths 21. Suitable connectors 23, preferably triangular as in the drawings, are secured to the loops of the end links and to the side chains 11.

It will be noted that each cross link 13 engages the surface of the road at a number of points, viz: the portions 24, 25 forming each turn 17 and the portions 26, 27 forming each turn 18. These portions are parallel to each other and are oblique to the tire so that they engage the surface at an angle. The portions 24, 25 and the portions 26, 27 each function as a unit and provide parallel oblique portions which will give traction, and in case the surface is icy will cut into the ice and prevent side slipping or skidding.

The undersides 28 of the loops 15 and 16 and the length 21 rest against the tire and form parallel oblique portions which are parallel to the portions 24, 25, and 26, 27, just described. The engagement of the portions 21 and 28 thus assist in holding the cross link in place, and in reinforcing the function of the road engaging portions. The portions 24, 25 and 26, 27 alternate with the portions 28, 21 and 28 so that the portions 24, 25 and 26, 27 are yieldingly supported upon the length 14, which is arched or curved above the surface of the tire, the ends, which form the loops 15 and 16, being the only parts in contact with the tire. Pressure on the portions 24, 25 and 26, 27 tends to straighten the length 14 which movement, being resisted by the contact of the portions 28 with the tire, causes the imbedding of the portions 28 in the tire.

The embodiment shown in Figs. 4, 5 and 6 differs from that above described only by reason of the omission of the turns 17 and 18. Hence in place of the road engaging portions 24, 25 and 26, 27 there are provided the single portions 30 and 31 which connect the loops 15 and 19 and 16 and 20. These portions 30 and 31 are parallel at an angle to the rotation of the wheel and the direction of the car, and their function which is the same as that of the portions 24, 25 and 26, 27 in the first embodiment, is reinforced, as in the first embodiment, by the engagement with the tire of the parallel portions comprising the undersides 28 of the loops 15 and 16 and the length 21.

Hence both embodiments have in common the provision of a cross chain made up of a plurality of substantially rectangular links connected at each corner to the adjoining links to prevent twisting or undue shifting relative to the tire when in action. Furthermore, all the portions of the links engaging the surface and engaging the tire are oblique or at an angle to the direction of movement of the vehicle and are parallel to each other so that the tire engaging portions reinforce the function of the road engaging portions, and supplement their function of preventing side slipping or skidding and providing the necessary traction under all circumstances. It will also be noted that the road engaging portions in either embodiment, i. e. 24, 25 and 26, 27 of the first embodiment and 30, and 31 of the second embodiment alternate with the tire engaging portions, i. e.: 28 and 21. The road engaging portions are thus yieldingly supported on the lengths 14 and are free from the surface of the tire so that pressure upon the road engaging portions is transmitted at right angles to the portions 28 and by imbedding them into the surface of the tire at an angle prevents any slipping of the chain relative to the tire. While this pressure is at right angles to the portions 28, it is at an acute angle to the tire and does no injury thereto.

While two embodiments of this invention have been shown and described, applicant is not limited thereto, since it is obvious that other embodiments can be made without departing from the spirit and scope of this invention as set forth in the following claims.

Having thus set forth my invention, what I claim as new and for which I desire protection by Letters Patent is:

1. In a tire chain comprising side chains and a plurality of cross chains, links in said cross chains, each of which links is formed so that it engages the surfaces of the road and of the tire along a plurality of portions parallel to each other and at an oblique angle to the direction of movement of the vehicle.

2. In a tire chain comprising side chains and a plurality of cross chains, links in said cross chains, each of which links is formed to provide a plurality of parallel portions at an oblique angle to the direction of movement of the vehicle, three of said portions engaging the surface of the tire and other portions engaging the surface of the road, the portions in said second group alternating with the portions in the first group.

3. In a tire chain comprising side chains and a plurality of cross chains, links in said cross chains, each of which links is formed to provide a plurality of parallel portions at an oblique angle to the direction of movement of the vehicle which portions engage the road and the tire, the road engaging portions being yieldingly supported by the tire engaging portions above the surface of the tire so pressure thereon is transmitted through the tire engaging portions to the tire at an acute angle.

In testimony whereof I have affixed my signature.

ALBERT OLSON.